United States Patent
Vissers et al.

[15] 3,683,272
[45] Aug. 8, 1972

[54] METHOD AND APPARATUS FOR DETERMINING HYDROGEN CONCENTRATION IN LIQUID SODIUM UTILIZING AN ION PUMP TO IONIZE THE HYDROGEN

[72] Inventors: Donald R. Vissers, Naperville; John T. Holmes, Downers Grove; Paul A. Nelson, Wheaton; Louis G. Bartholme, Joliet, all of Ill.

[73] Assignee: The United States of America as represented by the United States Atomic Energy Commission

[22] Filed: Nov. 24, 1970

[21] Appl. No.: 92,466

[52] U.S. Cl.........................324/33, 73/19, 176/19 R
[51] Int. Cl........G01n 27/00, G01n 7/00, G21c 7/00
[58] Field of Search......324/33; 73/19, 23; 176/19 E, 176/19 J, 19 R; 204/195 P

[56] References Cited

UNITED STATES PATENTS

| | | | |
|---|---|---|---|
| 3,498,900 | 3/1970 | Banks | 324/33 |
| 3,565,769 | 2/1971 | Holden | 204/195 |
| 3,451,256 | 6/1969 | Kolodney | 73/19 |
| 2,671,337 | 3/1954 | Halsberg | 73/23 |
| 2,882,212 | 4/1959 | Beard | 204/195 |

*Primary Examiner*—Robert J. Corcoran
*Attorney*—Roland A. Anderson

[57] ABSTRACT

A device for and method of measuring hydrogen concentration in liquid sodium to detect water leaks into the sodium. A thin-wall, tubular, annealed nickel probe in contact with liquid sodium is connected to an ion pump. A vacuum is created within said nickel probe by the ion pump, causing hydrogen atoms in the liquid sodium to diffuse through the wall of the probe and be drawn into the ion pump wherein the hydrogen atoms are ionized. The current generated within the ion pump by the ionization of hydrogen atoms is measured, this current being indicative of the hydrogen concentration in the liquid sodium.

11 Claims, 2 Drawing Figures

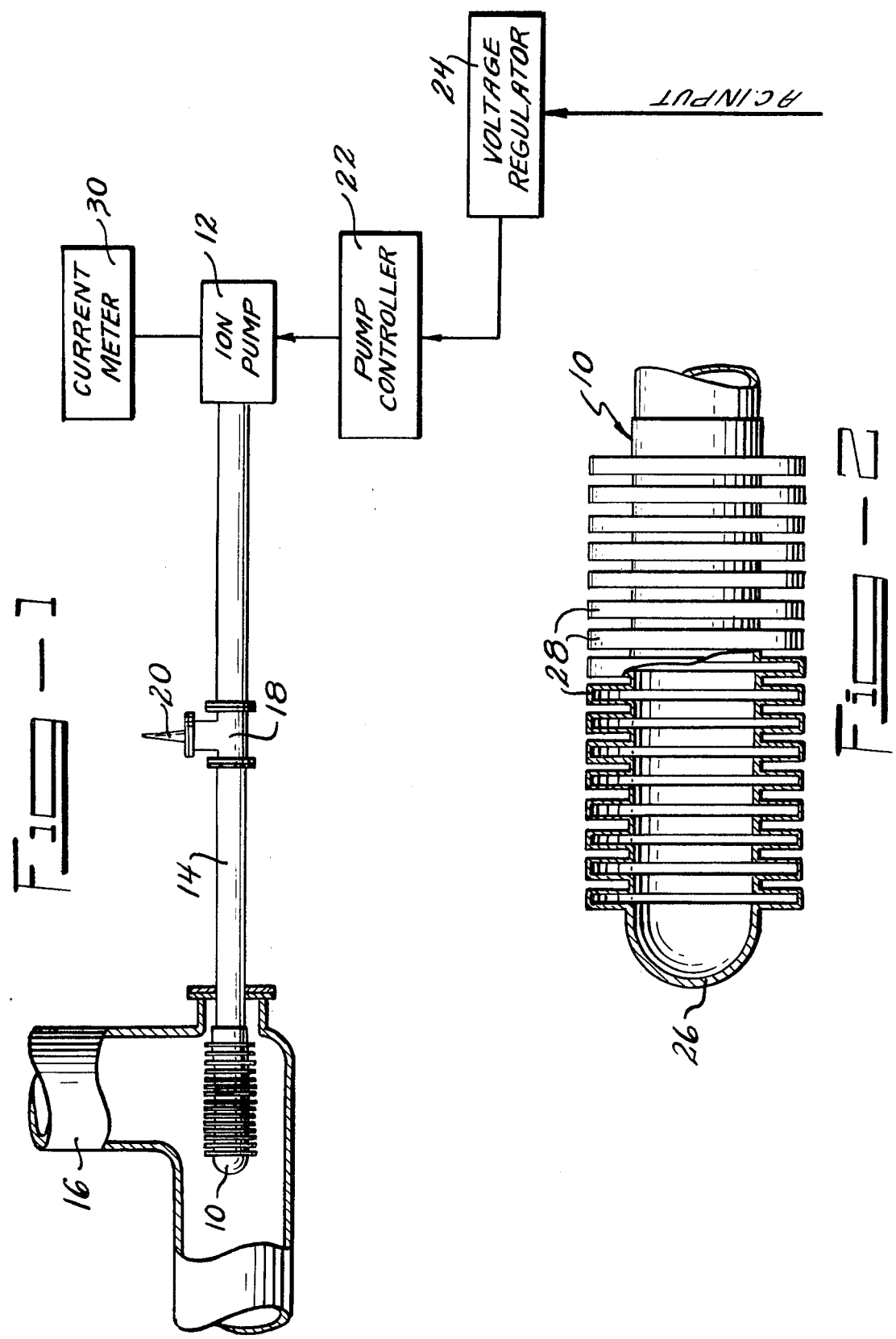

METHOD AND APPARATUS FOR DETERMINING HYDROGEN CONCENTRATION IN LIQUID SODIUM UTILIZING AN ION PUMP TO IONIZE THE HYDROGEN

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to the measurement of hydrogen in liquid sodium. More specifically, the invention relates to the measurement of the hydrogen concentration in the liquid sodium coolant of a sodium-cooled nuclear reactor for the purpose of detecting water leakage into the liquid sodium.

A major concern in the operation of liquid sodium-cooled nuclear reactors is water leakage into the liquid sodium occurring in the steam generator module. The steam generator is simply a heat exchanger in which heat is transferred from the sodium coolant system to water. The violent sodium-water reaction resulting from such a water leak causes rapid corrosion and erosion of metal tubes adjacent to the leak. A sufficiently large or long-lasting leak could result in the deformation and rupture of the steam generator shell itself, the shell encasing the hot liquid sodium as well as the heat exchange tubes through which water flows. Hence, it is imperative that even the smaller water leaks be detected immediately if propagation of damage is to be avoided.

The present invention is based on the detection of the hydrogen produced by the sodium-water reaction. The device and method according to the present invention detects and measures the change in hydrogen concentration in the liquid sodium caused by this production of hydrogen. Such a device and method require sensitivity and rapid response to changes in hydrogen concentration, as well as reliability. It would be desirable to be able to detect water leaks as small as $1.0 \times 10^{-4}$ lb/sec, which is safely below the leak rate at which significant erosion and wastage of metal from tubes adjacent to the leak occur. The reaction products of such leaks, primarily hydrogen and oxygen dissolved in liquid sodium, would be mixed with the entire sodium stream flowing from the steam generator. Therefore, to detect $1.0 \times 10^{-4}$ lb/sec of water leakage in the largest of steam generators, it would be necessary to measure an increase in the hydrogen concentration of about 0.004 ppm. At a normal level of hydrogen in liquid sodium of about 0.1 ppm, this amounts to about a 4 percent increase in the hydrogen concentration. Such a detection system must also respond rapidly to an increase in hydrogen concentration to allow rapid shutdown of the steam generator, yet with a minimum risk of unnecessary shutdown.

Other methods or devices for measuring the hydrogen concentration in liquid sodium include the following: Removing a sodium sample from the sodium coolant followed by any number of various laboratory techniques for determining the hydrogen concentration of the sample; using mechanical or oil diffusion pumps in conjunction with a nickel or other metal membrane permeable to hydrogen, placing the membrane in contact with he liquid sodium, and causing the hydrogen in the liquid sodium to diffuse across the membrane until an equilibrium is achieved, after which the amount of hydrogen in equilibrium is determined by a pressure gage; using an oil diffusion pump in conjunction with a nickel membrane in contact with the liquid sodium, causing the hydrogen in the liquid sodium to continually diffuse across the nickel membrane, and from this determining the hydrogen concentration in the liquid sodium with a mass spectrometer; and removing hydrogen from the liquid sodium by diffusion across a nickel-coated palladium membrane with subsequent oxidation of the hydrogen by the palladium to form $H_2O$ which is then quantitatively measured. Some of these devices or methods, however, do not meet all the requirements necessary for such a leak detector. Either they are not measuring the hydrogen concentration continuously, are not sufficiently sensitive so as to detect the presence of the smaller leaks, or do not determine the hydrogen concentration and respond to any changes therein sufficiently rapidly so as to detect water leakage prior to significant metal wastage and damage propagation.

It is therefore an object of this invention to provide a device for and method of measuring the hydrogen concentration in liquid sodium.

It is a further object to provide a device for and method of measuring the hydrogen concentration in liquid sodium continuously and without the necessity of removing sodium samples from the liquid sodium.

It is also an object of this invention to provide a device for and method of measuring hydrogen concentration changes in the liquid sodium coolant of a sodium-cooled nuclear reactor in a manner which is rapid, reliable and sufficiently sensitive so as to detect hydrogen concentration changes resulting from water leakage into the sodium coolant as small as $10^{-4}$ lb/sec.

Another object of this invention is to provide a device for and method of detecting water leaks into the liquid sodium coolant system of a liquid sodium-cooled nuclear reactor as small as $1.0 \times 10^{-4}$ lb/sec by detecting the hydrogen produced from the reaction which occurs when water contacts the liquid sodium.

Further objects and advantages of the invention will be apparent from the following detailed description of the device and method.

SUMMARY OF THE INVENTION

In practicing this invention for the measuring of the hydrogen concentration in liquid sodium, a thin-wall, tubular, annealed nickel probe whose outer surface is in contact with the liquid sodium is connected to an ion pump. A voltage, accurately controlled at a very precise and constant level, is applied to the electrodes of the ion pump. The ion pump creates a vacuum within the nickel probe of approximately $10^{-6}$ to $10^{-8}$ Torr, thereby causing hydrogen atoms in the liquid sodium to diffuse through the wall of the nickel probe and be drawn into the ion pump wherein the hydrogen atoms are ionized. The current generated by the ionization of the hydrogen atoms is measured. Because this current is linearly related to the number of hydrogen atoms ionized within the ion pump, it is indicative of the hydrogen concentration in the liquid sodium and thereby will indicate water leaks into the liquid sodium coolant of a liquid sodium-cooled nuclear reactor by measuring increases in the hydrogen concentration of the liquid sodium resulting from such water leaks.

BRIEF DESCRIPTION OF THE DRAWINGS

The invention device is illustrated in the drawings, of which:

FIG. 1 is a view showing the components of a device illustrating an application of the present invention.

FIG. 2 is an enlarged, partially sectional view of a nickel probe used in the practicing of the present invention.

DETAILED DESCRIPTION OF THE INVENTION

In FIG. 1 there is shown a device illustrating the application of the present invention whereby nickel probe 10, connected to an ion pump 12 by way of tubing 14, is inserted into pipe 16 which contains hot flowing liquid sodium. As nickel probe 10 is evacuated to a pressure of $10^{-6}$ to $10^{-8}$ Torr by ion pump 12, the partial pressure of hydrogen in the liquid sodium causes hydrogen atoms to diffuse through the wall of probe 10, after which the hydrogen atoms are drawn into ion pump 12 wherein they are ionized.

In order to initiate operation of ion pump 12, a vacuum of approximately $10^{-3}$ Torr must first be created within probe 10, tubing 14 and ion pump 12. Any means to accomplish this may be used. In the preferred embodiment, vacuum port 18, comprising a high-purity copper pinch-off fitting 20, is located between probe 10 and ion pump 12. A standard sorption vacuum pump is attached to fitting 20 and is used to obtain the desired vacuum of $10^{-3}$ Torr. Once this vacuum has been obtained and ion pump 12 put into operation, the sorption pump is pinched off at fitting 20 and removed, fitting 20 retaining an air-tight seal after the removal of the sorption pump.

Pump controller 22 converts the A.C. input, 110 A.C. in the illustrated device, to a D.C. output and applies this output voltage to the electrodes of ion pump 12 in the amounts as specified below. The voltage which is applied to the ion pump electrodes must be controlled accurately at a very precise and constant level to the extent that the ion pump current generated when hydrogen atoms are ionized is constant to within ±0.1 percent, ±0.05 percent in the preferred embodiment, for any particular concentration of hydrogen in the liquid sodium. This accurately controlled voltage at a precise and constant level is critical. If this is not maintained within the limitations given above, fluctuations in the applied voltage will cause inconsistent ionization of hydrogen atoms within ion pump 12, resulting in ion pump current fluctuations which bear no connection to changes in the hydrogen concentration of the liquid sodium. If this were to occur, the device would not be sufficiently sensitive. This critically precise voltage level used in conjunction with the stated ion pump vacuum range of $10^{-6}$ to $10^{-8}$ Torr is what gives this device its significant sensitivity. Any voltage-regulating means for obtaining this precise and constant voltage level may be used. In the preferred embodiment, voltage regulator 24 is used to achieve this purpose.

FIG. 2 shows the preferred structure for nickel probe 10, although the invention is not limited to the use of such a structure. Probe 10 is constructed from nickel because of the facts that hydrogen will diffuse through a thin nickel membrane and that nickel is chemically inert in liquid sodium. Probe 10 is tubular in shape and 1 to 4 inches in length, the particular device illustrated being 1 inch in length. It has an inner diameter no greater than 0.5 inch, the preferred diameter being nine thirty-seconds inch is sufficiently small to allow the hydrogen to be rapidly drawn away from the inner surface of wall 26, thereby promoting rapid hydrogen diffusion. Circumferential nickel fins 28 are three thirty-seconds inch in height and number 15 per inch of probe length. The hollow fins 28 give probe 10 mechanical strength while creating a large surface area of approximately 40 $cm^2$ in a 1-inch-long for sufficient hydrogen diffusion. The surface area of probe 10 is more important than its actual length, for the surface area must be sufficiently great, 10 to 60 $cm^2$, so as to be able to detect the hydrogen in the liquid sodium. Wall 26 can range from 0.008 to 0.020 inch in thickness, the preferred thickness being 0.01 inch.

A critical characteristic of probe 10 is that it must be annealed at 600° to 900° C. for 10 to 60 hours, the preferred annealing being performed at 800° C. for 25 to 30 hours. This was discovered to be necessary if a uniform diffusion rate of hydrogen through wall 26 is to be maintained over an extended period of time while probe 10 remains in contact with hot liquid sodium. Without such annealing, the hot liquid sodium would itself slowly anneal probe 10 over a period of time, thereby gradually and continually changing the hydrogen diffusion properties of probe 10. This would result in the illustrated device being insufficiently sensitive and unreliable.

Turning back to FIG. 1, ion pump 12 contains two electrodes consisting of titanium plates 0.125 inch in thickness. Tantalum may also be used as the cathode material. A voltage of 2,700 to 5,000 volts D.C., 4,750 volts D.C. in the preferred embodiment, is applied to the electrodes. A voltage of less than 2,700 volts D.C. would result in insufficient ionization of hydrogen atoms, while greater than 5,000 volts D.C. would cause ion pump 12 to overheat. As hydrogen atoms are drawn into ion pump 12, they are ionized between the two electrodes, thereby creating a current.

The size of ion pump 12, meaning thereby the pumping rate of the ion pump, can vary in accordance with the surface area of probe 10. In the particular device illustrated, ion pump 12 has a pumping rate of 11 liters/second. The lower limitation to the size of ion pump 12 would be 1 liter/second, for below this pumping rate the size of probe 10 would be sufficiently small so as to prohibit sensitive and reliable measurements of the hydrogen concentration in the liquid sodium. The upper limitation to the size of ion pump 12 would be 20 liters/second, for a pumping rate greater than this would require very large fittings as well as a very large probe 10, which is undesirable, if the desired vacuum of $10^{-6}$ to $10^{-8}$ Torr is to be obtained.

Table I shows the fluctuations in the ion pump current when the applied voltage level is not accurately controlled at a precise and constant level. Table II shows how the presence of voltage regulator 24, only one of many possible voltage-regulating means, results in a precise and constant voltage applied to the ion pump electrodes, causing a much more constant and consistent ion pump current.

TABLE I

Hydrogen concentration in sodium = 0.1 ppm

Ion pump current ($\mu$amps) taken at one-second intervals

| | | | |
|---|---|---|---|
| 16.76 | 16.55 | 16.59 | 16.80 |
| 16.52 | 16.99 | 17.50 | 17.53 |
| 17.01 | 17.54 | 16.55 | 17.29 |
| 17.57 | 17.20 | 17.35 | 16.57 |
| 16.53 | 16.63 | 16.60 | 16.63 |

Mean = 16.95  Standard Deviation  $\sigma = 0.392$
$2\sigma = 0.784$
or 4.62%

TABLE II

Hydrogen concentration in sodium = 0.1 ppm

Ion pump current ($\mu$amps) taken at one-second intervals

| | | | |
|---|---|---|---|
| 18.03 | 18.02 | 18.05 | 18.02 |
| 18.04 | 18.03 | 18.04 | 18.02 |
| 18.05 | 18.04 | 18.03 | 18.02 |
| 18.02 | 18.04 | 18.02 | 18.03 |
| 18.04 | 18.04 | 18.03 | 18.04 |

Mean = 18.03  Standard Deviation  $\sigma = 0.0107$
$2\sigma = 0.0214$
or 0.12%

Current meter 30 is used to accurately measure the current generated when hydrogen atoms are ionized within ion pump 12. This current is linearly related to the number of hydrogen atoms ionized and is therefore indicative of the hydrogen concentration in the liquid sodium. The basis for this relationship is Sievert's Law, wherein the hydrogen concentration in the liquid sodium, $S$, equals the square root of the hydrogen pressure, $P$, within probe 10 times a constant $K$. See equation (1):

$$K\sqrt{P} = S \qquad (1)$$

The pressure of hydrogen within probe 10 is directly related to the current generated within ion pump 12. Therefore, from the reading of current meter 30, the hydrogen concentration in the liquid sodium can be calculated either mathematically or from prepared graphs. However, a preferred method is simply to initially calibrate current meter 30 in terms of known concentrations of hydrogen in liquid sodium, thereby eliminating any need for calculation and allowing the hydrogen concentration in the liquid sodium to be determined directly from current meter 30.

When water leakage into the liquid sodium coolant of a sodium-cooled nuclear reactor occurs, the normal level of hydrogen concentration in the liquid sodium coolant changes. The basis for this change is the sodium-water reaction which occurs upon contact of the water with the sodium. The following formulas indicate this reaction:

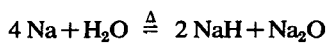

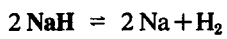

As can be seen from the above formulas, hydrogen is produced when water leaks into the liquid sodium, thereby causing an increase in the hydrogen concentration level in the liquid sodium. Therefore, if the hydrogen concentration of the liquid sodium coolant is measured continuously, an unexpected increase in this concentration at any time would indicate a water leak.

Measuring the hydrogen concentration in liquid sodium and changes therein was performed by connecting a thin-wall, tubular nickel probe, having been annealed at approximately 800° C. for 25 to 30 hours, to an ion pump. The nickel probe and ion pump were then evacuated to $10^{-3}$ Torr using a standard sorption vacuum pump. A voltage of 4,750 volts D.C. at a very precise and constant level was then applied to two titanium electrodes located within the ion pump. Using the ion pump, a vacuum of $10^{-6}$ to $10^{-8}$ Torr was created within the nickel probe. The nickel probe was then inserted into the liquid sodium having a temperature of 500° C. flowing through pipe 16. Hydrogen atoms in the liquid sodium then diffused through the wall of the nickel probe and were drawn into the ion pump, wherein the hydrogen atoms were ionized. The current generated by the ionization of the hydrogen atoms was then measured, and since this current is linearly related to the number of hydrogen atoms ionized in the ion pump, as previously explained, it was indicative of the hydrogen concentration in the liquid sodium. Results have shown that this method is sufficiently sensitive to detect a hydrogen concentration of 0.1 ppm ± a 1 percent change. The nickel probe and ion pump were evacuated prior to inserting the nickel probe into the liquid sodium in order to check for any leaks in the system.

It is important that the vacuum created within the nickel probe be within the stated range of $10^{-6}$ to $10^{-8}$ Torr. A vacuum higher than $10^{-8}$ Torr will allow background noise or minor fluctuations in the voltage across the electrodes of the ion pump to interfere with consistent and correct readings of the ion pump current due to the natural hydrogen gases in the system, thereby creating fluctuations in the ion pump current and making the device and method insensitive and unreliable. If the vacuum is lower than $10^{-6}$ Torr, the ion pump will overheat.

The sodium coolant of a sodium-cooled nuclear reactor will have a normal hydrogen concentration level somewhere in the range of approximately 0.1 to 2.0 ppm. The normal hydrogen concentration level will not remain constant, however, but rather it will have a slow and expected drift between both ends of an expected concentration range, such as between 0.1 and 0.5 ppm. This must be taken into account when attempting to detect water leaks by way of hydrogen concentration changes. Therefore, in using the above-described method, any unexpected increase in hydrogen concentration at variance with the norm would indicate a water leak and thereby allow the nuclear reactor to be shut down before any significant damage or wastage occurs.

This device and method must be sufficiently sensitive to detect water leaks of $1.0 \times 10^{-4}$ lb/sec, a leak rate safely below that at which significant damage and metal wastage occur. This means detecting a hydrogen concentration increase of about 0.004 ppm with a sodium flow rate of $1 \times 10^7$ lb/hr, which is a 4 percent increase if the normal hydrogen concentration is about 0.1 ppm.

With either a slower sodium flow rate and/or a greater leak rate at a normal hydrogen concentration of 0.1 ppm, the percent increase in hydrogen concentration is much greater. Tests have indicated that the above-described device and method are sensitive to a 1 percent increase in hydrogen concentration at a normal hydrogen concentration level of 0.1 ppm.

It is also necessary in order to avoid significant damage and wastage that water leaks be detected quickly. Hence, a leak detector must respond rapidly with the above-mentioned sensitivity to changes in the hydrogen concentration in liquid sodium. To avoid said damage, a leak of 0.01 lb/sec should be detected within 0.5 to 5.0 minutes after the onset of such leak. The response time of the device and method described herein depends mainly on the rate of hydrogen diffusion through the wall of the nickel probe. Calculations indicate that for a 0.01-inch-thick nickel probe at 500° C., 70 percent of the eventual total change in hydrogen flux would occur after only 10 seconds. Therefore, the device and method described herein has a sufficiently rapid response time with the required sensitivity.

Another necessity for such a leak detector is that it be reliable. The device and method described herein once in operation need no further adjustments or calculations. This device has the advantages of being inexpensive, compact and permanently installed while operating continuously with the required sensitivity and responsiveness. It will continue to do so without recalculation so long as air-tight integrity is insured and the above-discussed critical limitations are met.

While the invention relates broadly to a device for and method of measuring the hydrogen concentration in liquid sodium, as has been disclosed, the device and method can be used for the detection of water leakage into the liquid sodium coolant of a sodium-cooled nuclear reactor based upon measuring hydrogen concentration changes in the liquid sodium coolant. The disclosed device and method have the sensitivity, rapid response, and reliability required for such a device and method if they are to be effective. Since there may be as many as 30 to 40 water-leak-detecting units on a sodium-cooled nuclear reactor, the fact that the disclosed device and method are relatively inexpensive is another advantage. Also, they have the further advantage of continuous measurement of hydrogen concentration and do not have the disadvantage of requiring removal of sodium from the system in order to make hydrogen concentration measurements, such removal of sodium being slow and inaccurate as well as placing personnel in the position of possible irradiation.

It will be understood that the invention is not to be limited to the details given herein but that it may be modified within the scope of the appended claims.

The embodiments of the invention in which an exclusive property or privilege is claimed are defined as follows:

1. A device for measuring hydrogen concentration in liquid sodium comprising a tubular, thin-wall nickel probe, which has been annealed at a temperature of 600° to 900° C. for 10 to 60 hours, having an outer surface exposed to the liquid sodium; an ion pump connected to said tubular nickel probe operable to evacuate the interior of said nickel probe whereby hydrogen atoms in the liquid sodium diffuse through the wall of the nickel probe and into the interior thereof and are drawn into the ion pump wherein said hydrogen atoms are ionized; means for applying a voltage to said ion pump, said voltage being maintained at a sufficiently precise and constant level so as to result in the current in said ion pump being constant to within ±0.1 percent for any particular concentration of hydrogen in said ion pump; and means for accurately measuring the current in said ion pump, the current in the ion pump being linearly related to the number of hydrogen atoms being ionized in the ion pump and thereby being indicative of the hydrogen concentration in the liquid sodium.

2. The device according to claim 1 wherein said device includes means for initially decreasing the pressure within said ion pump and said nickel probe to approximately $10^{-3}$ Torr.

3. The device according to claim 2 wherein said nickel probe has a wall thickness of 0.008 to 0.020 inch, an inner diameter no greater than 0.5 inch, a length of 1 to 4 inches, and a surface area of 10 to 60 $cm^2$.

4. The device according to claim 3 wherein said ion pump contains two titanium or one titanium and one tantalum electrodes and has a pumping rate of 1 to 20 liters/second.

5. The device according to claim 4 wherein said means for applying an accurately controlled voltage to said ion pump comprises an ion pump controller, said controller converting an A.C. input to a D.C. output of 2,700 to 5,000 volts D.C. and applying said output voltage to the electrodes of said ion pump, and voltage-regulating means for maintaining said voltage at said sufficiently precise and constant level.

6. The device according to claim 3 wherein said nickel probe comprises a tubular member, said tubular member being 1 inch in length and having an inner diameter of nine thirty-seconds inch and a wall thickness of 0.01 inch; and hollow, circumferential nickel fins, numbering 15 fins per inch of length of said tubular member, having a wall thickness of 0.01 inch and projecting three thirty-seconds inch out from the outer surface of said tubular member, said fins, the interiors of which are open to the interior of said tubular member, providing increased mechanical strength and increased surface area for greater hydrogen diffusion, the surface area of said nickel probe being approximately 40 $cm^2$.

7. The device according to claim 6 wherein said nickel probe has been annealed at 800° C. for 25 to 30 hours.

8. The device according to claim 7 wherein the ion pump contains two titanium electrodes 0.125 inch in thickness and has a pumping rate of 11 liters/second.

9. The device according to claim 8 wherein said means for applying an accurately controlled voltage to said ion pump comprises an ion pump controller, said controller converting a 110 volt A.C. input to a D.C. output of 4,750 volts D.C. and applying said output voltage to the electrodes of said ion pump, and a voltage regulator wherein the voltage applied to the electrodes of said ion pump is maintained at a sufficiently precise and constant level so as to result in the current in said ion pump being constant to within ±0.05 percent for any particular concentration of hydrogen in said liquid sodium; and wherein said means for accurately indicating current in said ion pump comprises a current meter wherein the current generated in said ion pump by the ionization of hydrogen atoms is indicated in terms of the hydrogen concentration in said liquid sodium to a sensitivity of 0.1 ppm ± 1 percent.

10. A method for measuring hydrogen concentration in liquid sodium comprising connecting a tubular, thin-wall nickel probe to an ion pump, said nickel probe having been annealed at a temperature of 600° to 900° C. for 10 to 60 hours; applying and maintaining a voltage to said ion pump at a sufficiently precise and constant level so as to result in the current in said ion pump being constant to within ±0.1 percent for any particular concentration of hydrogen in said ion pump; creating a vacuum with said ion pump of $10^{-6}$ to $10^{-8}$ Torr within the nickel probe; contacting the outer surface of said nickel probe with liquid sodium, thereby causing hydrogen atoms in said liquid sodium to diffuse through the wall of the nickel probe and into the interior thereof and be drawn into said ion pump wherein the hydrogen atoms are ionized; and measuring the current generated by the ionization of the hydrogen atoms within the ion pump, said current being linearly related to the number of hydrogen atoms ionized and thereby indicative of the hydrogen concentration in the liquid sodium.

11. A method for detecting water leakage into the liquid sodium coolant of a liquid sodium-cooled nuclear reactor comprising connecting a tubular, thin-wall nickel probe to an ion pump, said nickel probe having been annealed at a temperature of 600° to 900° C. for 10 to 60 hours; applying and maintaining a voltage to said ion pump at a sufficiently precise and constant level so as to result in the current in said ion pump being constant to within ±0.1 percent for any particular concentration of hydrogen in said ion pump; creating a vacuum with said ion pump of $10^{-6}$ to $10^{-8}$ Torr within the nickel probe; inserting said nickel probe into the liquid sodium coolant whereby the outer surface of said nickel probe is in contact with the liquid sodium, thereby causing hydrogen atoms in said liquid sodium coolant to diffuse through the wall of the nickel probe and the interior thereof and be drawn into said ion pump wherein the hydrogen atoms are ionized; and continuously measuring the current generated by the ionization of the hydrogen atoms within the ion pump, said current being linearly related to the number of hydrogen atoms ionized and therefore continuously indicating the hydrogen concentration in the liquid sodium, any unexpected increase of said current being indicative of water leakage into said liquid sodium coolant.

* * * * *